(12) United States Patent
Dubois et al.

(10) Patent No.: US 6,418,794 B1
(45) Date of Patent: Jul. 16, 2002

(54) PROPULSION THRUST TEST SYSTEM

(75) Inventors: Neil J. Dubois, Cranston, RI (US); William S. Wilkinson, North Dartmouth, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/412,195

(22) Filed: Oct. 4, 1999

(51) Int. Cl.$^7$ ................................................. G01N 3/08
(52) U.S. Cl. ...................................................... 73/826
(58) Field of Search ............................... 73/826, 865.9, 73/862.49, 862, 862.393; 244/12.1, 12.6; 440/38, 41, 6; 405/209; 114/263

(56) References Cited

U.S. PATENT DOCUMENTS

| | | | |
|---|---|---|---|
| 4,471,708 A | * 9/1984 | Wilson et al. | 114/265 |
| 4,874,269 A | * 10/1989 | Dysarz | 405/209 |
| 5,045,004 A | * 9/1991 | Kim | 440/45 |
| 5,289,068 A | * 2/1994 | Veronesi et al. | 310/114 |
| 5,527,194 A | * 6/1996 | Strong et al. | 73/862.69 |

* cited by examiner

Primary Examiner—Benjamin R. Fuller
Assistant Examiner—Octavia Davis
(74) Attorney, Agent, or Firm—Michael J. McGowan; James M. Kasischke; Prithvi C. Lall

(57) ABSTRACT

A system is provided for testing a propulsor having a first end that can attach to a payload and a second end at which thrust is generated. A bulkhead is sealed to the first end of the propulsor. The bulkhead with the propulsor coupled thereto is suspended vertically by a support that is placed in tension when thrust is generated at the second end of the propulsor. A load cell coupled to the support measures tension therein as a measure of thrust.

11 Claims, 2 Drawing Sheets

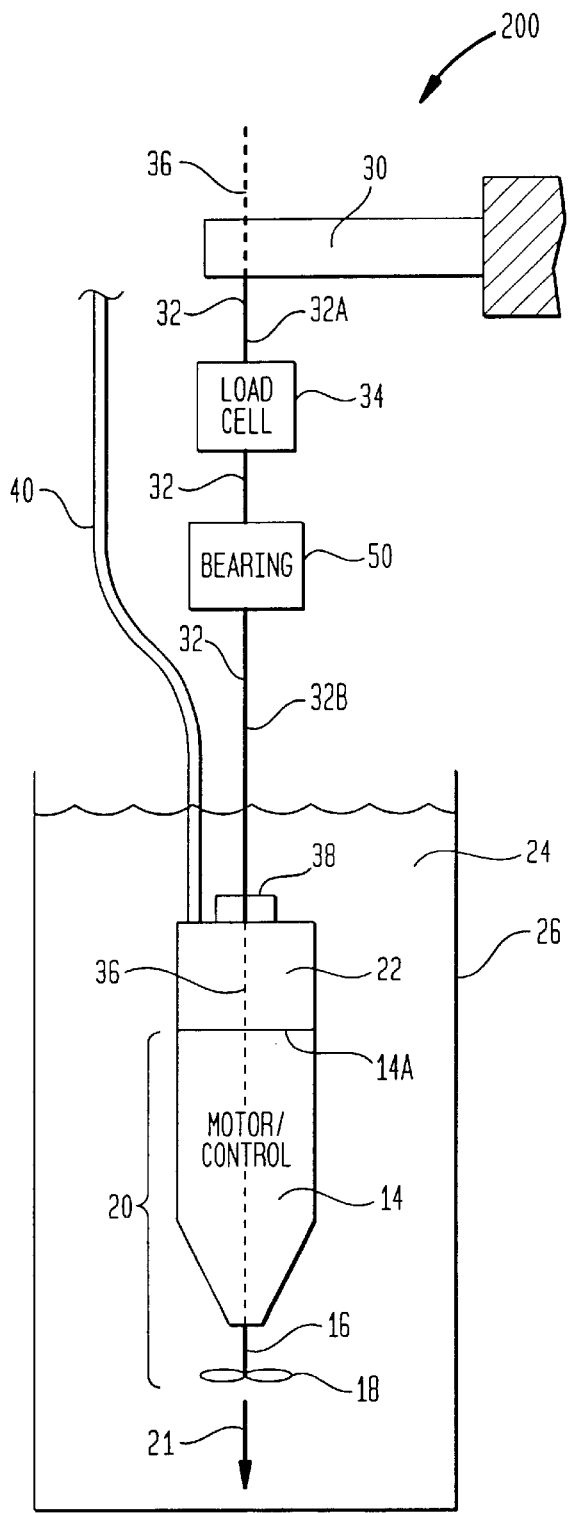
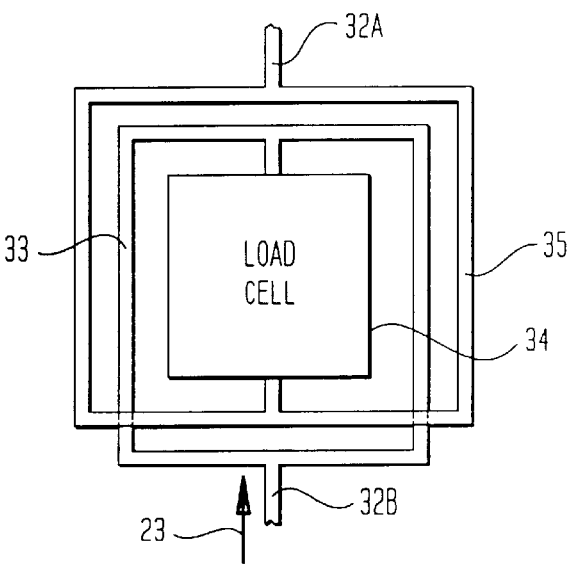

PROPULSION THRUST TEST SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to measuring thrust of an underwater propulsor, and more particularly to a test system for measuring thrust of an underwater propulsor in a shallow tank of water.

(2) Description of the Prior Art

Some underwater propulsion systems are designed to hover in place. For example, the U.S. Navy utilizes many acoustic devices which must hover at a prescribed depth underwater. These hovering acoustic devices typically utilize a propulsion system consisting of a motor and a propeller that generally faces up towards the water's surface. The propeller generates thrust to counteract the force of gravity thereby allowing the device to hover in the water. During the design of these devices, it would be beneficial to measure the thrust generated by the propeller in order to determine overall device performance.

SUMMARY OF THE INVENTION

Accordingly, it is an object of the present invention to provide a system for measuring the thrust produced in the water by a hovering motor/propeller device.

Another object of the present invention to provide a system that can operate in a shallow water tank to measure thrust produced by a hovering motor/propeller device.

Other objects and advantages of the present invention will become more obvious hereinafter in the specification and drawings.

In accordance with the present invention, a system for testing a propulsor is provided. The propulsor has a first end that can attach to a payload and a second end at which thrust is generated. A platform extends over a fluid. A support coupled to the platform extends vertically downward therefrom into the fluid. A load cell is coupled in line with the support to measure tension therein. A bulkhead is sealed to the first end of the propulsor and is coupled to the support in the fluid. The thrust generated at the second end places the support in tension for measurement by the load cell.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is a schematic view of another embodiment of the system for testing propulsion thrust in which rotational torque generated by the propulsion can also be evaluated; and FIG. 4 is a schematic view of a jig that can be used to translate a compression force into tension for measurement by a tension-measuring load cell.

DESCRIPTION OF THE PREFERRED EMBODIMENT(S)

Figure 1:
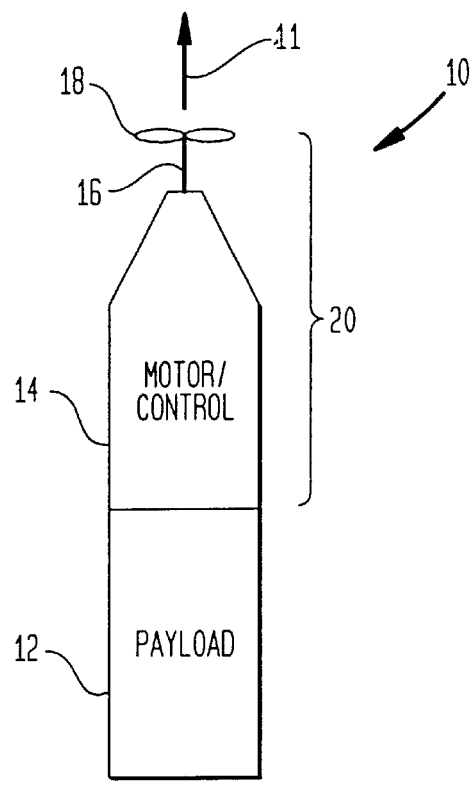
FIG. 1 is a schematic view of an underwater hovering device that includes an underwater hover propulsor.

Referring now to the drawings, and more particularly to FIG. 1, an underwater hovering device is illustrated and referenced generally by numeral 10. Device 10 is shown in its underwater hover orientation in which a payload 12 (e.g., an acoustic device) is coupled to a propulsor 20. Propulsor 20 consists of a motor/control section 14, a propeller drive shaft 16 extending from motor section 14 and a propeller 18 coupled to drive shaft 16. In operation, propeller 18 is rotated to generate thrust that tends to propel device 10 in an upward direction as indicated by arrow 11 in order to allow device 10 to hover in water.

Figure 2:
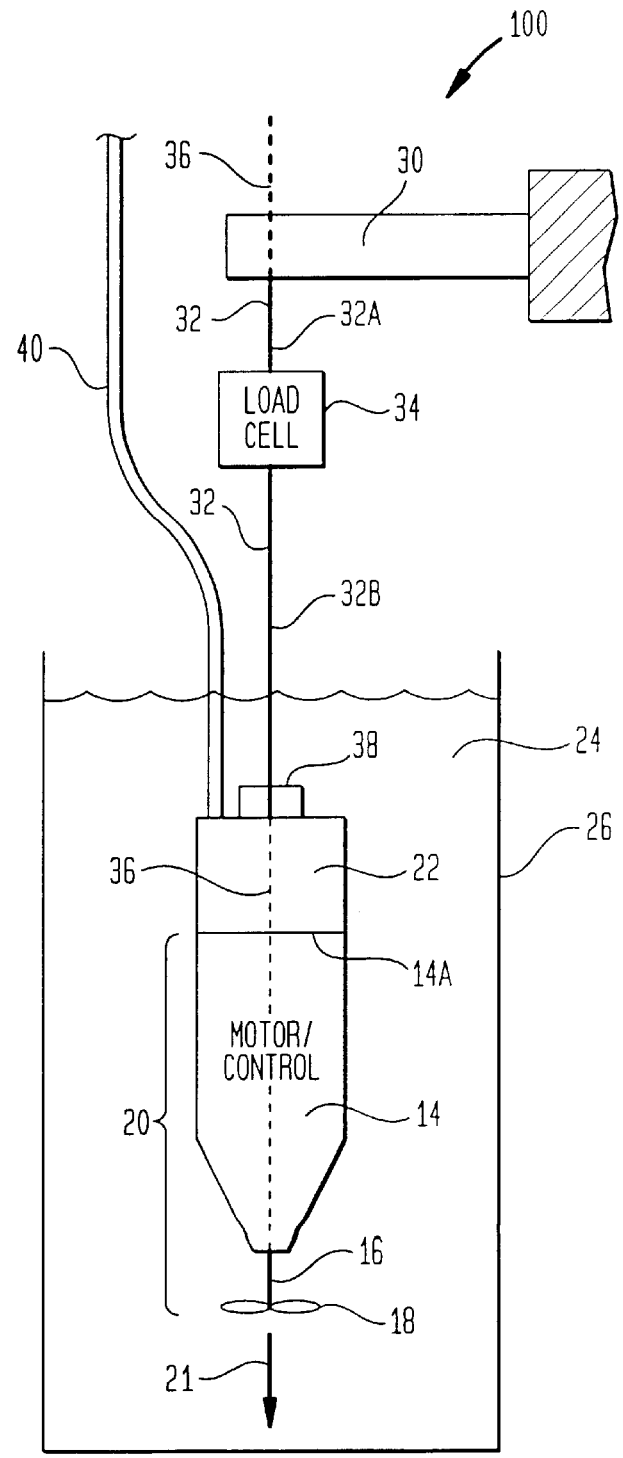
FIG. 2 is a schematic view of one embodiment of a system for testing propulsion thrust according to the present invention.

Referring now to FIG. 2, a system for testing an underwater propulsor in terms of thrust produced thereby is illustrated and referenced generally by numeral 100. By way of example, system 100 will be described for use with a propeller-type hover propulsor 20 consisting of motor section 14, propeller shaft 16 and propeller 18 such as that described above. In place of a payload, a bulkhead 22 is attached to end 14A of motor section 14 to provide a watertight seal of motor section 14 and a structural point of attachment. The combination of bulkhead 22 and propulsor 20 is suspended in water 24 which can be contained within a tank 26. Preferably, the combination of bulkhead 22 and propulsor 20 is suspended in water 24 such that propeller 18 is facing down (towards the bottom of tank 26) as opposed to up (towards the surface of water 24) as would normally be the case if propulsor 20 were part of a hovering device such as that illustrated in FIG. 1. In this way, when propeller 18 is rotated in its intended direction, the thrust generated thereby will tend to pull propulsor 20 and bulkhead 22 downward in a direction indicated by arrow 21 which is, preferably, substantially perpendicular to the surface of water 24.

Suspending the combination of bulkhead 22 and propulsor 20 as described is a rigid suspension system that includes, for example, a rigid horizontal support 30 extending over water 24 and a rigid vertical support 32 depending and extending down from horizontal support 30 into water 24. Vertical support 32 is rigid in order to prevent device 10 from contacting the walls or bottom of tank 26. Horizontal support 30 is any rigid platform, deck, walkway, or any other structural member, that extends out over water 24. Vertical support 32 can be integral with, or rigidly attached to (e.g., threaded, bolted, etc.), horizontal support 30 to extend vertically downward therefrom, i.e., aligned with the force of gravity. On its other end, vertical support 32 is rigidly attached to bulkhead 22. Coupled to vertical support 32 is a force measuring device or load cell 34 for measuring tension in vertical support 32.

By way of illustrative example, vertical support 32 and load cell 34 can be implemented as follows. Vertical support 32 can be a threaded (steel) rod having an upper portion 32A bolted to horizontal support 30. The bottom of upper portion 32A is threaded into one side of load cell 34 which can be a model MLP-25 load cell manufactured by Transducer Techniques, or the like. The top of a lower portion 32B is threaded into the other side of load cell 34 while the bottom of lower portion 32B is threaded/bolted to bulkhead 22. For simplicity of measurement, vertical support 32 and load cell 34 define a common line of support or a suspension axis 36 which is aligned with propeller shaft 16. Finally, for stability, the combination of bulkhead 22 and propulsor 20 should be negatively ballasted (i.e., will not float) when in water. Accordingly, it may be necessary to add weight 38 to this combination so that a downward force (i.e., tension) is applied to vertical support 32 even when thrust 21 is not being generated. Weight 38 can be attached to or made integral with bulkhead 22 while permitting the passage of vertical support 32 therethrough. Weight 38 need only be sufficient to apply a slight downward force to vertical support 32, which can be measured by load cell 34 before any thrust data is taken.

System 100 is designed to only measure thrust 21. However, the rotation of drive shaft 16 and propeller 18 can generate rotational torque which may have to be evaluated. Accordingly, it may be desirable to allow bulkhead 22 and propulsor 20 to rotate about drive shaft 16/suspension axis 36. To do this, a bearing assembly 50 can be mounted in line with vertical support 32 as in system 200 which is illustrated in FIG. 3.

In operation, system 100 (or system 200) is assembled as shown and described. If necessary, a cable 40 is led through bulkhead 22 to motor section 14 in order to supply the necessary power and control signals to motor section 14 from a host control platform (not shown). When rotated, propeller 18 generates thrust in the direction of arrow 21 which places vertical support 32 in tension. Load cell 34 produces an electrical signal proportional to the tension which can be converted to pounds of thrust.

The advantages of the present invention are numerous. By using only the hover propulsor portion of an underwater hovering device, the system of the present invention can be used to conduct thrust testing in a small tank of water. Inverting the propulsor simplifies its suspension and power/control hookup. The load cell and bearing assembly (if used) can be maintained in a dry location thereby improving their reliability and life. The setup is easy to assemble/disassemble.

Although the present invention has been described relative to specific embodiments thereof, it is not so limited. For example, the present invention could also be used to test thrust for a propulsor that directed its thrust upward, i.e., opposite that of thrust 21. However, to take advantage of load cell 34 which measures tension, a jig is necessary to convert the compression forces into tension as illustrated in FIG. 4. Specifically, lower portion 32B of vertical support 32 includes a frame 33 on either side of load cell 34 that attaches to the topside of load cell 34. In a similar fashion, upper portion 32A of vertical support 32 includes a frame 35 on either side of load cell 34 that attaches to the bottom side of load cell 34. In this way, a compression force 23 in lower portion 32B caused by upward thrust from a propulsor (not shown) is converted to a tension force at load cell 34.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for testing a propulsor having a first end that can attach to a payload and having a second end at which thrust is generated, said system comprising:
   a liquid;
   a platform extending over the liquid;
   a first support aligned with a force of gravity, said first support coupled on one end thereof to said platform and terminating at another end thereof above the liquid;
   a second support aligned with the force of gravity and extending from a point above the liquid to a point in the liquid;
   a load cell coupling said first support to said second support, said load cell measuring tension in said first support and said second support in a direction aligned with the force of gravity; and
   a bulkhead sealed to the first end of the propulsor and coupled to said second support in the liquid, wherein only said bulkhead and the propulsor are fully submerged in the liquid with the propulsor being suspended in the liquid with the second end thereof aligned with the force of gravity such that the thrust is directed therealong.

2. A system as in claim 1 wherein said platform extends horizontally over the liquid.

3. A system as in claim 1 wherein the said fluid is water, said bulkhead and the propulsor define a combination, said system further comprising a weight coupled to said combination for negatively ballasting said combination in the water.

4. A system as in claim 1 wherein said first support, said load cell, said second support, said bulkhead and the propulsor are linearly aligned with one another to define a linear arrangement having a common axis.

5. A system as in claim 4 wherein said common axis is aligned substantially vertically.

6. A system as in claim 4 wherein said bulkhead and the propulsor define a combination, said system further comprising means coupled to said linear arrangement and in line with said common axis thereof for permitting rotation of said combination about said common axis.

7. A system as in claim 1 wherein:
   said first support is rigid and is rigidly coupled to said platform;
   said load cell is rigidly coupled between said first support and said second support; and
   said second support is rigid and is rigidly coupled to said bulkhead.

8. A system for testing an underwater hover propulsor having a first end that can attach to a payload and having a second end at which hovering thrust is generated, said system comprising:
   a tank of water, said water having a surface;
   a platform extending over said tank;
   a rigid support rigidly coupled to said platform and extending vertically downward therefrom into the water, said rigid support having a first portion maintained above said tank of water and a second portion extending into said tank of water;
   a load cell rigidly coupled in line between said first portion and said second portion of said rigid support for measuring tension therein; and
   a bulkhead sealed to the first end of the propulsor and rigidly coupled to said second portion of said rigid support in said tank of water, wherein the hovering thrust generated at the second end is directed substantially perpendicular to the surface of the water thereby placing said rigid support in tension.

9. A system as in claim 8 wherein said platform extends horizontally over said tank.

10. A system as in claim 8 wherein said bulkhead and the propulsor define a combination, said system further comprising a weight coupled to said combination for negatively ballasting said combination in the water.

11. A system as in claim 8 wherein said bulkhead and the propulsor define a combination having an axis in line with that of said rigid support, said system further comprising means coupled in line with said rigid support for permitting rotation of said combination about said axis.

* * * * *